United States Patent

Natsume

[11] Patent Number: 5,582,481
[45] Date of Patent: Dec. 10, 1996

[54] VEHICULAR MARKER LAMP LENS CONFIGURATION FOR PROVIDING A DEPTH IMAGE

[75] Inventor: Kazunori Natsume, Shimizu, Japan

[73] Assignee: Koito Manufacturing Co., Ltd., Tokyo, Japan

[21] Appl. No.: 362,155

[22] Filed: Dec. 22, 1994

[30] Foreign Application Priority Data

Dec. 22, 1993 [JP] Japan .................. 5-073212 U

[51] Int. Cl.⁶ .................................................. F21V 5/00
[52] U.S. Cl. .................. 362/336; 362/61; 362/332; 362/335
[58] Field of Search .................... 362/61, 335, 336, 362/338, 329, 332, 333

[56] References Cited

U.S. PATENT DOCUMENTS

| | | | |
|---|---|---|---|
| 1,726,460 | 8/1929 | Upp | 362/336 |
| 2,220,145 | 11/1940 | Cooke | 362/332 X |
| 4,868,725 | 9/1989 | Sakagawa et al. | 362/231 |
| 5,081,564 | 1/1992 | Mizoguchi et al. | 362/61 |
| 5,287,101 | 2/1994 | Serizawa | 340/815.76 |

*Primary Examiner*—Stephen F. Husar
*Attorney, Agent, or Firm*—Sughrue, Mion, Zinn, Macpeak & Seas

[57] ABSTRACT

An automotive marker lamp has a lens on which there are formed both convex and concave semicylindrical steps, all extending parallel to each other. Each convex step creates the real image of the light source outside lens whereas each concave step creates the virtual of the light source inside the lens. Thus the lamp gains a depth image when glowing.

10 Claims, 5 Drawing Sheets

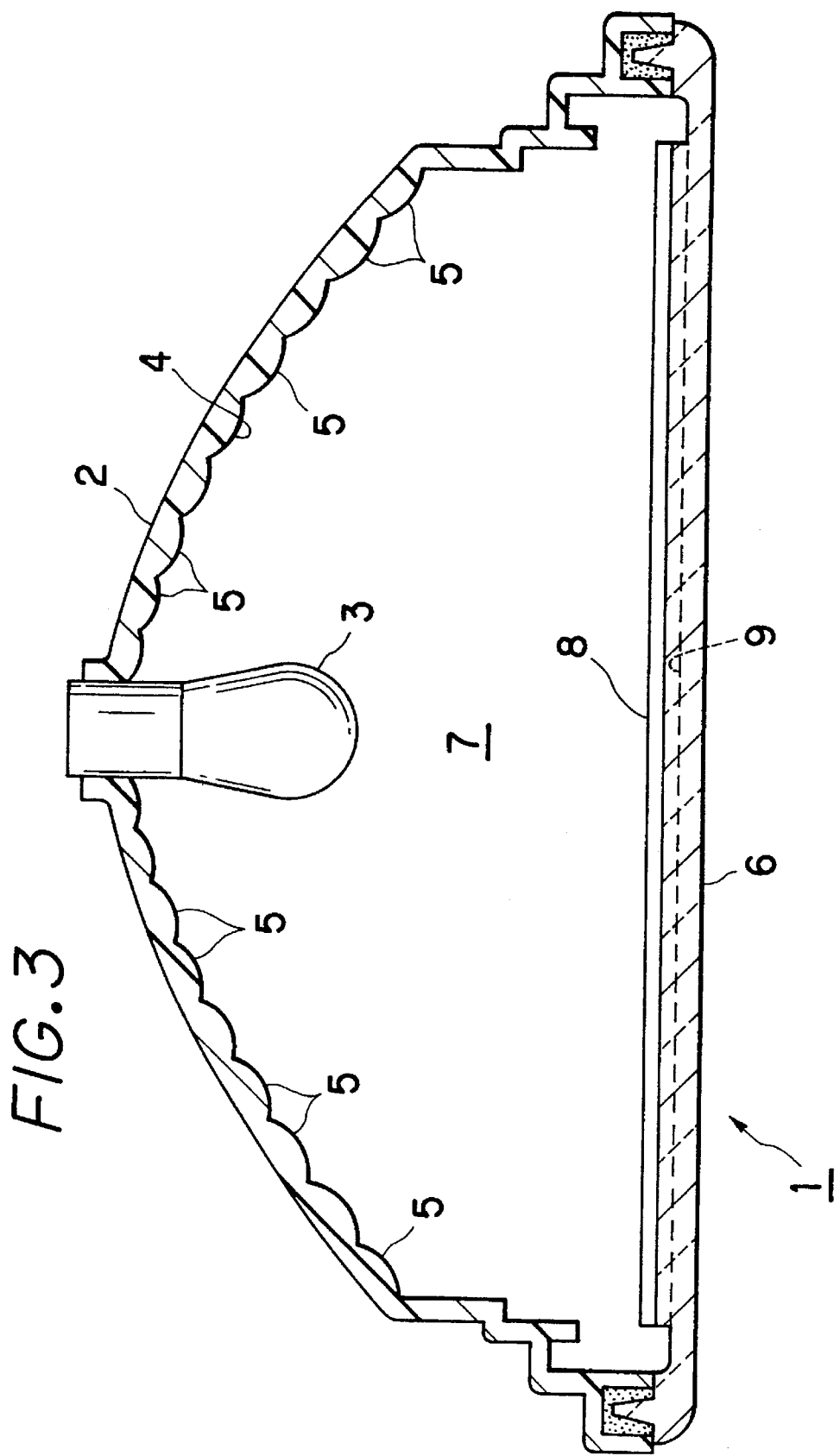

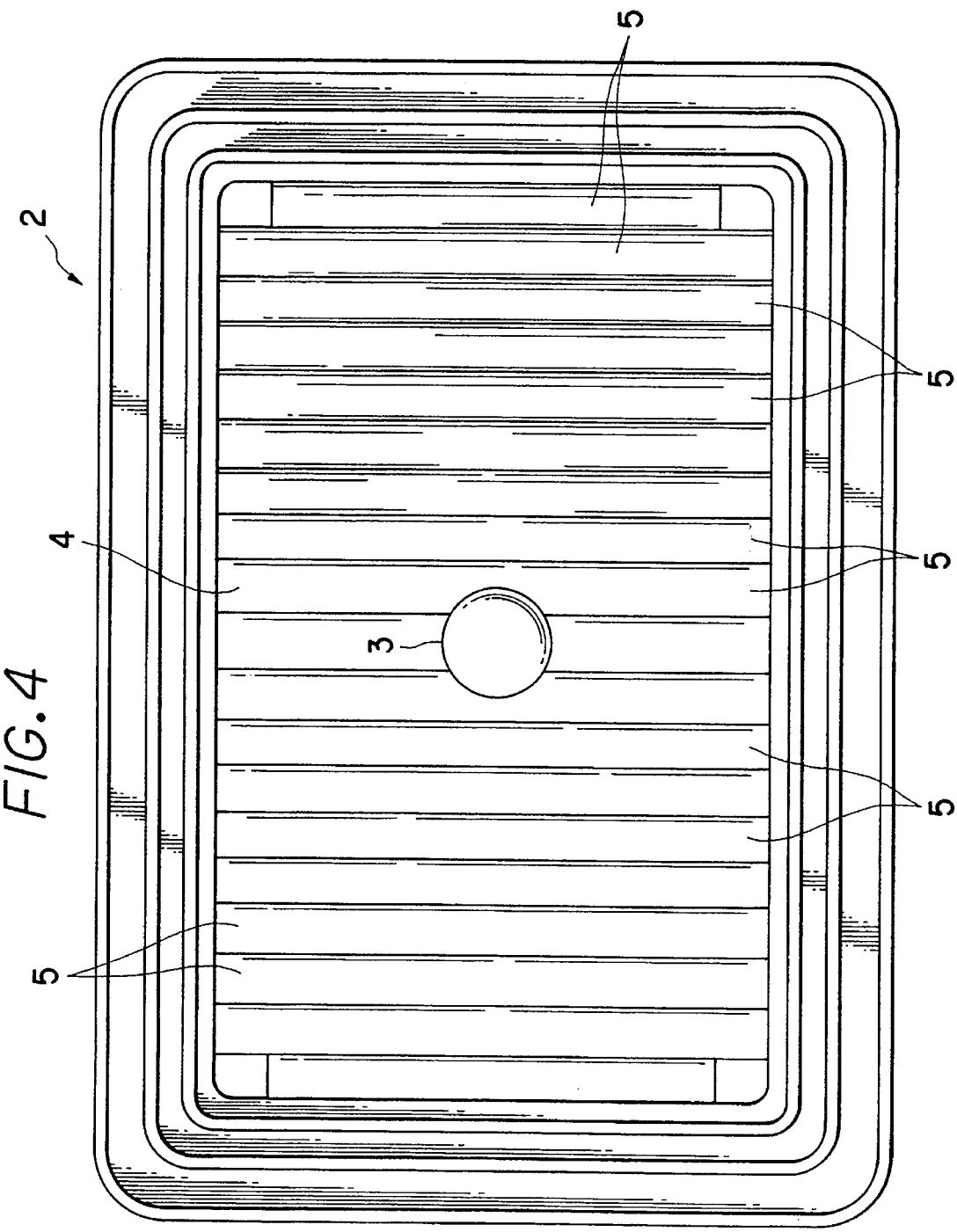

VEHICULAR MARKER LAMP LENS CONFIGURATION FOR PROVIDING A DEPTH IMAGE

BACKGROUND OF THE INVENTION

This invention relates to electric lamps in general and, in particular, to those suitable for use as marker or signal lamps on motor vehicles, among other applications. More particularly, the invention deals with improvements in the lens of such lamps.

A typical conventional lens configuration for automotive marker lamps such as stop lamps and tail lamps was that having fisheye steps over the entire lens surface, thereby to diverse vertically the light being emitted. The creation of the fisheye steps over the entire lens surface is unsatisfactory, however, because of the planar image of the lamp when lit up, and of the resulting lack of apparent quality or aesthetic appeal. There have, indeed, been strong demands from automobile manufactures for more "classy" marker lamps suiting higher grade

SUMMARY OF THE INVENTION

The present invention seeks to enhance the aesthetic attraction of lamps of the kind defined, by imparting a greater depth image thereto.

Briefly, the invention may be summarized as an electric lamp suitable for use as a marker lamp on motor vehicles, among other applications. The lamp comprises a lamp body having an open end, a lens closing the open end of the lamp body and defining a lighting chamber in combination with the lamp body, and a light source disposed in the lighting chamber. Characteristically, the lens is formed to include a plurality of convex semicylindrical steps and a plurality of concave semicylindrical steps of various possible arrangements.

The convex semicylindrical lens steps create the real images of the light source outside the lens, and the concave semicylindrical lens steps the virtual images of the light source inside the lens. By virtue of this positional difference of the real and virtual images of the light source, the lamp gains a deeper, three dimensional appearance when glowing.

The above and other features and advantages of this invention and the manner of realizing them will become more apparent, and the invention itself will best be understood, from a study of the following description and appended claims, with reference had to the attached drawings showing a preferable embodiment of the invention.

BRIEF DESCRIPTION OF THE DRAWINGS

FIG. 3 is a horizontal section through the marker lamp, taken along the line III—III in FIG. 1;

FIG. 4 is a from elevation of the lamp body of the marker lamp; and

DESCRIPTION OF THE PREFERRED EMBODIMENT

Figure 1:
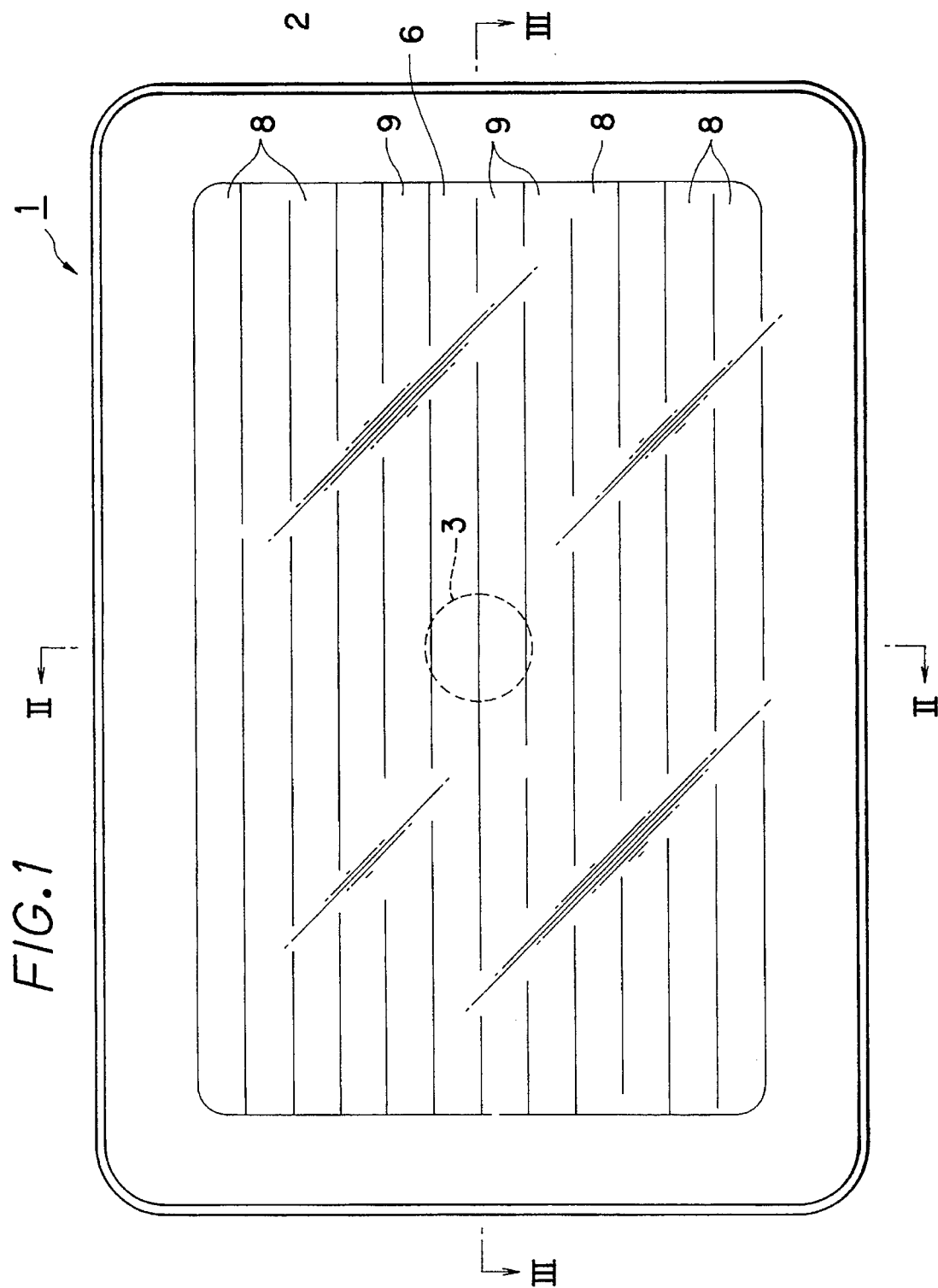
FIG. 1 is a from elevation of the automotive marker lamp embodying the principles of this invention.

The invention will now be described in detail as embodied in the illustrated automotive marker lamp. Generally designated 1 in FIGS. 1–3, the marker lamp has a lamp body 2 opening forwardly, or toward the viewer as seen in FIG. 1, leftwardly in FIG. 2, and downwardly in FIG. 3. The open front end of the lamp body 2 is closed by a lens 6 to define a fighting chamber 7. Disposed in this lighting chamber, an electric lighting bulb 3 is mounted centrally to the closed rear end of the lamp body 2.

For reflecting the light emitted by the bulb 3, the lamp body 2 has a reflective surface 4 best revealed by FIG. 4. The reflective surface 4 is shown comprised of a plurality or multiplicity of ribs 5 of approximately semicylindrical shape extending side by side in the vertical direction. Thus the beam of light from the bulb 3 will be reflected by the lamp body surface 4 to gain a tendency to diverge laterally.

Figure 2:
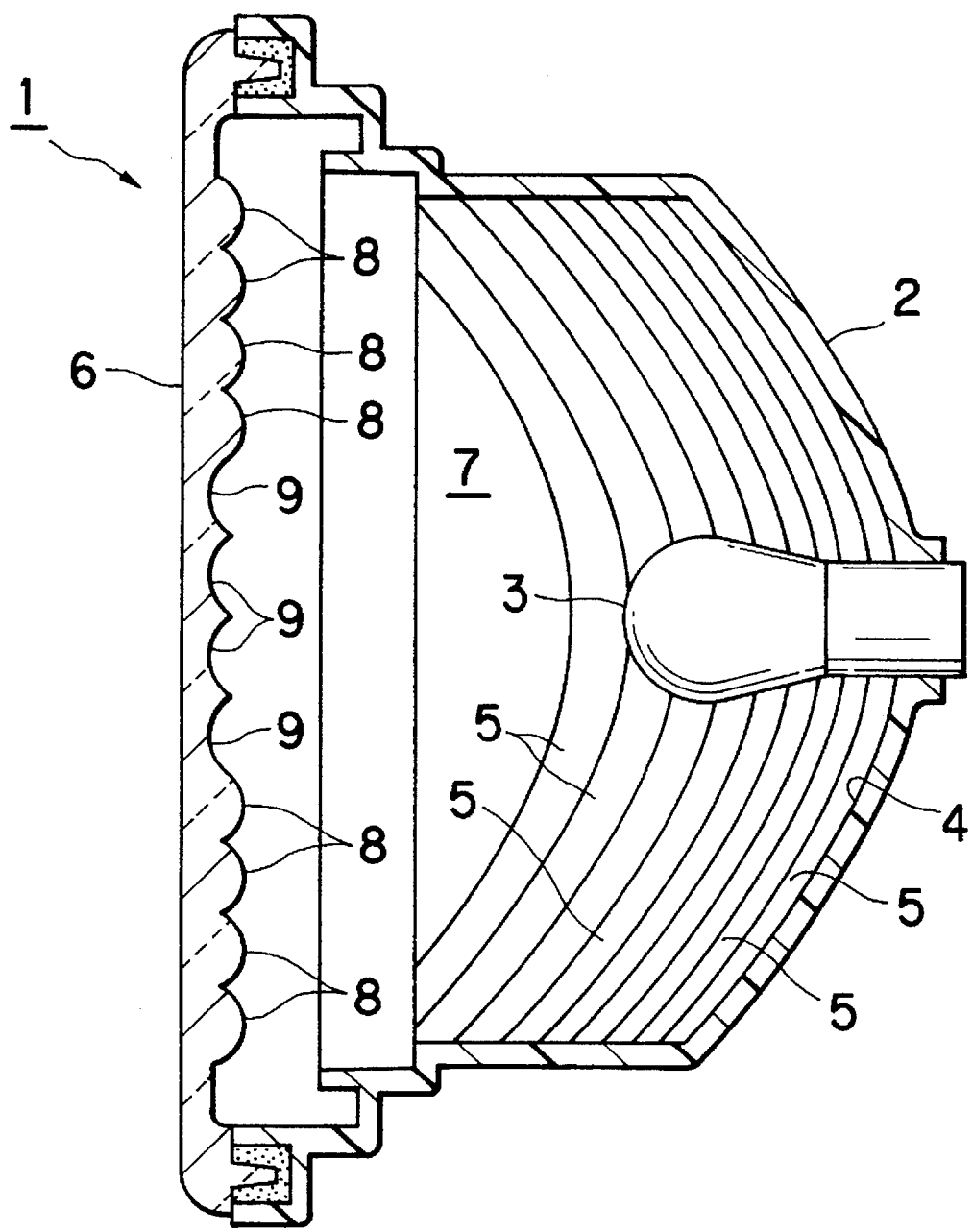
FIG. 2 is a vertical section through the marker lamp, taken along the line II—II in FIG. 1.

Molded from a transparent synthetic resin, the lens 6 is specially configured according to the invention to impart a depth image to the lamp 1. With reference to FIGS. 1 and 2 in particular, the lens 6 may be thought of as being optically divided into three regions in the vertical direction in this particular embodiment. The three optical regions include the two at the top and the bottom which are each comprised of a set of convex semicylindrical steps 8 extending side by side in the horizontal direction, and the intermediate one comprised of a set of concave semicylindrical steps 9 also extending side by side in the horizontal direction. The convex semicylindrical steps 8 and the concave semicylindrical steps 9 are all formed on that side of the lens 6 which confronts the lamp body 2.

Figure 5A:
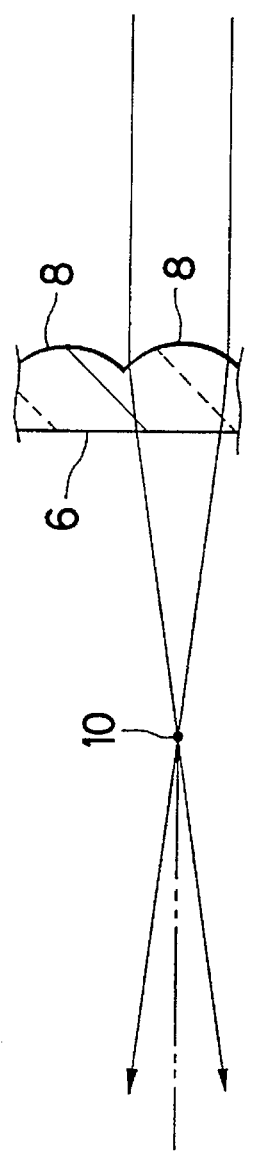
FIG. 5, consisting of (A) and (B), is an illustration explanatory of the operating principles of the invention.
Figure 5B:
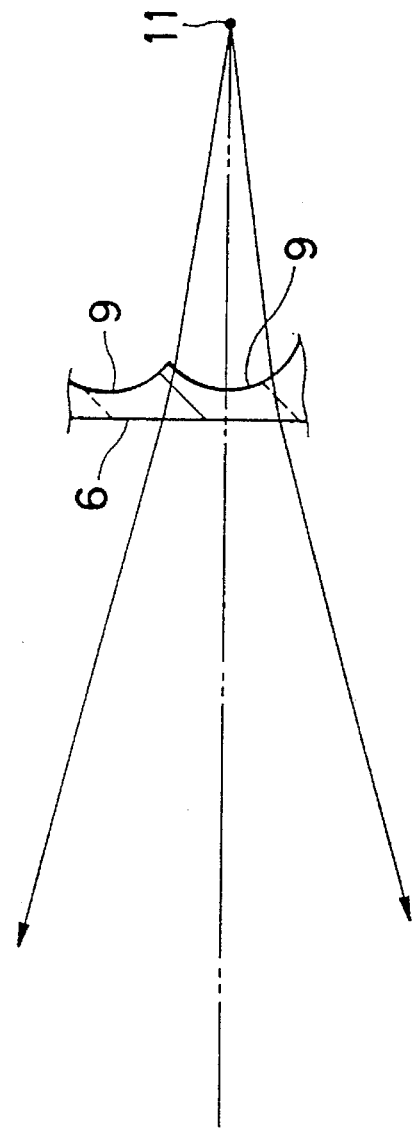

As depicted at (A) in FIG. 5, each convex semicylindrical lens step 8 creates the real image of the light source 3 at 10, forwardly or outside of the lens 6. Each concave semicylindrical lens step 9, on the other hand, creates the virtual image of the light source 3 at 11, rearwardly or inside of the lens 6, as at (B) in FIG. 5. As the convex and concave semicylindrical lens steps 8 and 9 are arranged as in FIGS. 1 and 2, the lamp will gain a three dimensional image, particularly in its front to rear depth direction, when lit up, due largely to the difference in that direction between the positions of the real and virtual images of the fight source.

The semicylindrical lens steps 8 and 9 are shown to extend horizontally simply because the semicylindrical ribs 5 on the lamp body 2 are shown to extend vertically in the illustrated embodiment. As the vertical semicylindrical ribs 5 diverge the light only laterally, it is preferable that the lens steps 8 and 9 be disposed horizontally for diverging the light vertically as well.

Conversely, in the case where the lens steps extend vertically for laterally diverging the light, then the ribs on the lamp body may extend horizontally for vertically diverging the light. However, the creation of the ribs on the lamp body constitutes no essential feature of the invention, all that is required or desired being that the lamp body be capable of diverging the light in a direction at right angles with that in which the light is diverged by the lens steps. The invention is understood to comprehend all such departures from the illustrated embodiment.

It will also readily occur to the specialists to set the radii of curvature of the convex and concave semicylindrical lens steps for some additional optical effects. For example, the radius of curvature of the concave semicylindrical lens steps may be so determined that the reflective surface of the lamp body may appear glowing through the lens, imparting a three dimensional appearance to the lamp.

Also, the illustrated arrangement of the lens steps, two groups of four convex semicylindrical steps and one group of concave semicylindrical steps in between, is by way of example only. Various other arrangements of the convex and concave semicylindrical lens steps, as well as various modifications and alterations of the other parts of the lamp, will suggest themselves to those skilled in the an within the scope of the present invention.

What is claimed is:

1. An electric lamp suitable for use as a marker lamp on motor vehicles, among other applications, comprising:
   (a) a lamp body having an open end;
   (b) a lens closing the open end of the lamp body and defining a lighting chamber in combination with the lamp body;
   (c) a light source disposed in the lighting chamber;
   (d) the lens being formed to include a plurality of convex semicylindrical steps and a plurality of concave semi-cylindrical steps whereby real and virtual images of the light source appear on opposite sides of the lens to impart a depth image to the lamp.

2. An electric lamp as set forth in claim 1 wherein said convex semi-cylindrical steps and concave semi-cylindrical steps are disposed on the inside of said lighting chamber.

3. An electric lamp suitable for use as a marker lamp on motor vehicles, among other applications, comprising:
   (a) a lamp body having a reflective surface capable of diverging light in one of two orthogonal directions, the lamp body also having an open end;
   (b) a lens closing the open end of the lamp body and defining a lighting chamber in combination with the lamp body;
   (c) a light source disposed in the lighting chamber;
   (d) the lens being formed to include a plurality of convex semicylindrical steps and a plurality of concave semi-cylindrical steps, all extending parallel to each other in a direction for diverging light in the other of the two orthogonal directions, whereby real and virtual images of the light source appear on opposite sides of the lens to impart a depth image to the lamp.

4. An electric lamp as set forth in claim 3 wherein said convex semi-cylindrical steps and concave semi-cylindrical steps are disposed on the inside of said lighting chamber.

5. An electric lamp suitable for use as a marker lamp on motor vehicles, among other applications, comprising:,
   (a) a lamp body having an open end;
   (b) a lens closing the open end of the lamp body and defining a lighting chamber in combination with the lamp body;
   (c) a light source disposed in the lighting chamber;
   (d) the lens being formed to include an alternate arrangement of at least one convex semicylindrical step and at least one concave semicylindrical step whereby real and virtual images of the light source appear on opposite sides of the lens to impart a depth image to the lamp.

6. An electric lamp as set forth in claim 5 wherein said convex semi-cylindrical steps and concave semi-cylindrical steps are disposed on the inside of said lighting chamber.

7. An electric lamp suitable for use as a marker lamp on motor vehicles, among other applications, comprising:
   (a) a lamp body having an open end;
   (b) a lens closing the open end of the lamp body and defining a lighting chamber in combination with the lamp body;
   (c) a light source disposed in the fighting chamber;
   (d) the lens being formed to include an alternate arrangement of at least one group of convex semicylindrical steps and at least one group of concave semicylindrical steps whereby real and virtual images of the light source appear on opposite sides of the lens to impart a depth image to the lamp.

8. An electric lamp as set forth in claim 7 wherein said convex semi-cylindrical steps and concave semi-cylindrical steps are disposed on the inside of said lighting chamber.

9. An electric lamp suitable for use as a marker lamp on motor vehicles, among other applications, comprising:
   (a) a lamp body having a reflective surface capable of diverging light in one of two orthogonal directions, the lamp body also having an open end;
   (b) a lens closing the open end of the lamp body and defining a lighting chamber in combination with the lamp body;
   (c) a light source disposed in the lighting chamber;
   (d) the lens being formed to include two groups of convex semicylindrical steps, and a group of concave semicylindrical steps interposed between the two groups of convex semicylindrical steps, all the semicylindrical steps extending parallel to each other in a direction for diverging fight in the other of the two orthogonal directions, whereby real and virtual images of the fight source appear on opposite sides of the lens to impart a depth image to the lamp.

10. An electric lamp as set forth in claim 9 wherein said convex semi-cylindrical steps and concave semi-cylindrical steps are disposed on the inside of said lighting chamber.

* * * * *